May 3, 1932. F. A. HAYES 1,856,249
FRICTION TRANSMISSION
Filed July 18, 1930
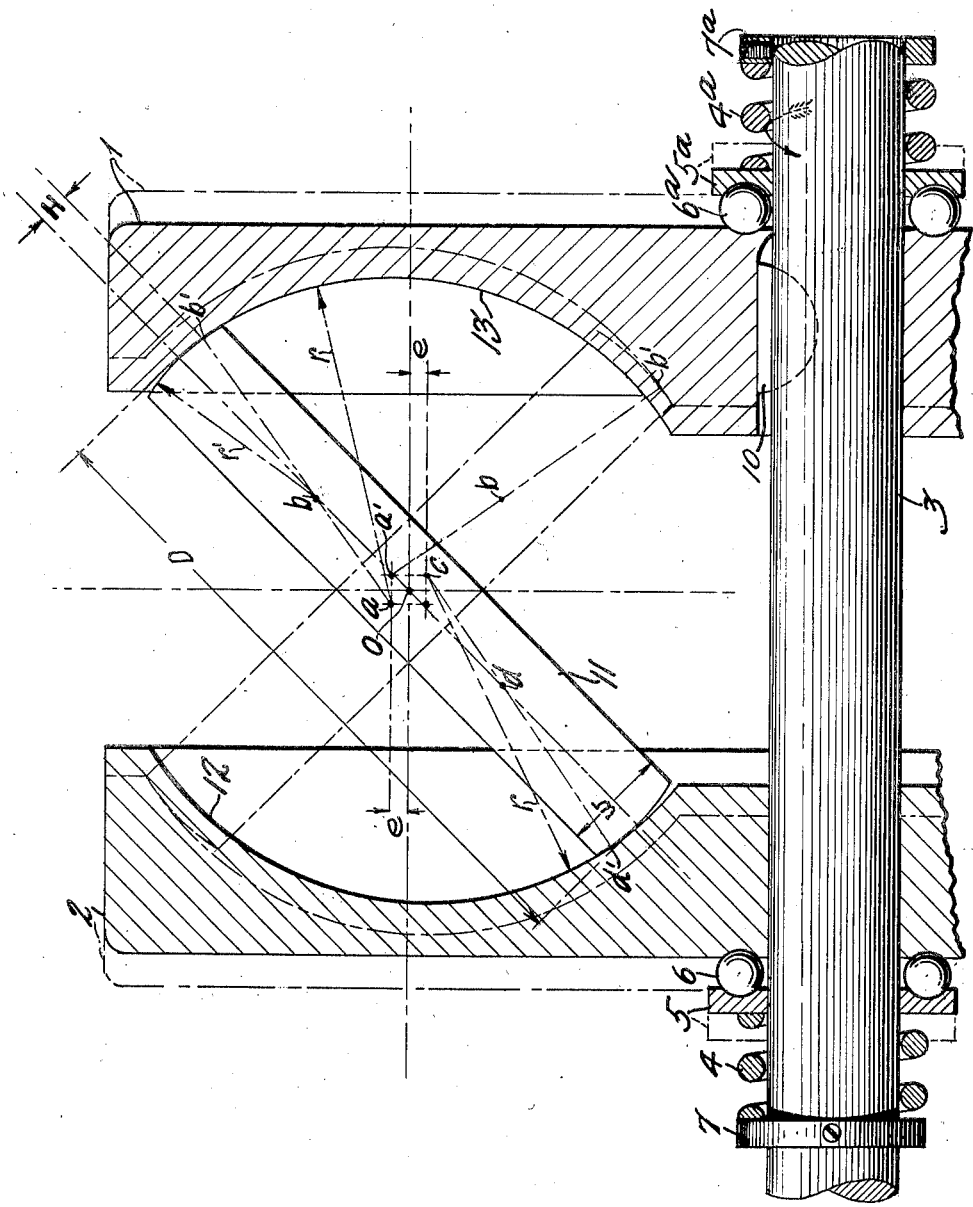
INVENTOR.
Frank A. Hayes
BY
ATTORNEY.

Patented May 3, 1932

1,856,249

UNITED STATES PATENT OFFICE

FRANK A. HAYES, OF MIDDLETOWN, NEW JERSEY

FRICTION TRANSMISSION

Application filed July 18, 1930. Serial No. 468,764.

This invention relates in general to variable speed friction transmissions of the toroidal disk type in which a plurality of rollers or "wheels" have frictional driving contact with toroidal grooves of circular cross section formed in the disks as shown and described in my Patent No. 1,698,229 of January 8, 1929.

The present invention relates more particularly to that portion of the transmission which produces the frictional driving pressures and has for one of its principal objects the provision of a simple and highly efficient means by which suitable variations in pressure may be obtained to provide the necessary friction between the frictionally engaged elements in accordance with the speed ratio. To attain this desired object, a new and novel means is herein proposed whereby the driving and the driven disks will be axially separated against the opposition of a yielding pressure means when the intermediate friction roller is moved from the high speed position to the low speed position thereby intensifying the pressure which is being imposed upon the frictionally engaged elements by the pressure means.

Various other objects and advantages of the invention will be in part obvious from an inspection of the accompanying drawings and a careful consideration of the following particular description and claims of one form of mechanism embodying my invention.

The motive force used to drive such transmissions is usually of the constant torque type, that is a prime mover such as a gas engine in which the maximum torque is fairly constant over a wide range of speed, or a more or less constant speed type having a relatively low overload factor such as an induction motor, or one of the shunt wound continuous current type. In either case the transmission must be provided with pressure enough to take care of the maximum torque of the prime mover at the lowest speed ratio of the transmission. This may be more than ten times the high speed requirement depending upon the range of the transmission, so that for uses such as in motor vehicles, where a large part of the operation is in the high speed range, a transmission of this type provided with a simple spring arrangement for applying the required pressure would operate most of the time at much higher pressure than required, with consequent low efficiency, overheating and deterioration.

In the prior art it has been proposed to obviate this difficulty by using a pressure device consisting of balls seated in pockets and dependent upon torque for its actuation. This ball and pocket construction is a relatively expensive manufacturing proposition which also adds to the complication and provides an undesirable element of play in the drive.

In the present invention, however, I obtain the necessary variation in pressure by simply offsetting the grooves in the two races with respect to the rollers i. e., locating the groove in the driving or low torque race farther from the disk axis than that in the driven or high torque race. This has the effect, in a radial section through the races of offsetting the cross-sectional curves or making them eccentric with respect to each other and to the friction roller which is normally placed midway between the two race curve centers. Then as the roller precesses or rocks from the high speed to the low speed position, the two races are spread apart, thereby compressing the spring (which urges the disks toward each other) and giving the necessary additional pressure. The actual curve of spring deflection or speed ratio may be further modified by making the roller diameter slightly different from that of the race contours. Thus if the roller is made larger, the pressure for the mid-speed or parallel position of the rollers will be reduced with respect to that for the extreme positions and vice versa.

The drawing is a longitudinal section and represents more or less diagrammatically a simple form of toroidal disk variable speed transmission, such as that of my Patent No. 1,698,229.

In the present instance 1 designates the driving or low-torque disk secured to shaft 3 by a key 10 and 2 is the driven disk floating on the shaft 3 and connected in any suitable manner to the machine intended to be driven at variable speed, or the disk 2 may be held stationary by some suitable means and the rollers operated in a planetary manner as more fully described in the above mentioned patent. A number of methods for supporting and articulating the roller 11 have been described in the prior art and as they are all applicable to my invention they are omitted for sake of simplicity.

The annular grooves or races of the disks are designated by 12 and 13 and the center of the race profile or contour 13 is shown at $a$, $o$ being the center of the roller and the axis about which the roller swings or precesses to change the speed ratio. The center of the race contour 12 is $c$, the radius of contour of the roller face being $r'$ and that of the disk races $r$. The diameter of the race or groove 13, from the center $a$ through the axis of shaft 3 to the corresponding center on the other side of the disk, is therefore greater than the corresponding diameter of race 12. It should be noted that $r'$ is less than $r$ and should be so chosen with reference to $w$ (the width of face of the roller) that the contact point $b'$ (found by producing line $a$—$b$ to $b'$ and $c$—$d$ to $d'$) is always within the face of the roller. It will be seen that the circle of contact on the roller passing through $b'$ is offset and always to one side of the center of the roller face, as indicated at H, while the corresponding contact portion of the roller for the disk 2 is on the opposite side. This is a great advantage as it materially increases the available contact area of the roller and thus greatly prolongs its life.

The high speed position of the roller 11 is shown by the full lines, whilst the low speed position is shown by the broken lines, and it will be seen that in the latter position the disks are axially separated by the roller, because of the eccentricity of the races, when said roller is moved from the high to the low speed position. This axial separation of the disks results in a compression of the spring means 4, 4$a$, thus increasing the spring pressure against the disks when the roller is in that position and correspondingly increasing the frictional contact between the driving elements when operating at low speed. If $e$ as shown is the eccentric displacement (relative to the centers $a$ and $c$) of the axis on which the roller rocks to effect speed changes, then the total axial movement of the disks as the roller swings from high to low speed with a maximum angle of 45 degrees either way from the mid position is approximately four times $e$.

A duplex spring means (4, 4$a$) has been shown in the drawing, but a single spring may be used to advantage if found more desirable. The spring means may be mounted so as to engage the collars 7, 7$a$ on the shaft 3 and anti-friction bearings 5, 6 and 5$a$, 6$a$ may be interposed between the springs and the disks so as to lessen the friction at this point.

Variations may be resorted to within the scope of the invention and portions of the improvements may be used without the others, whilst not departing from the spirit of the invention.

Having thus described my invention, I claim:

1. In a variable speed friction transmission mechanism, in combination, a pair of coaxial axially separated disks adapted for relative axial movement and provided with inwardly facing annular grooves, a friction roller cooperating frictionally with the groove surfaces and adjustable angularly to vary the speed ratio of the mechanism, and yielding pressure means tending to produce relative movement of approach of the disks; the profile centers of the grooves being at different radial distances from the disk axis whereby as the roller is adjusted to different angular positions the axial separation is varied with consequent change in the pressure exerted by the yielding means.

2. A mechanism as described in claim 1, in which the center of the roller is between the profile centers of the grooves.

3. In a variable speed friction transmission mechanism, in combination, a disk having a toroidal groove, a coaxial disk having a toroidal groove of greater diameter through the disk axis than the diameter of the other but of the same profile curvature, a roller cooperating frictionally with the grooves and adjustable to different angular positions relative to the disk axis to vary the speed ratio of the mechanism, and spring means for causing relative movement of approach of the disks.

4. In a variable speed friction transmission mechanism, in combination, a pair of axially separable coaxial disks having opposed toroidal grooves whose profiles are circular arcs of the same radius but whose centers of profile curvature are different distances from the disk axis, a friction roller cooperating with the groove surfaces and adjustable angularly with respect to the disk axis to vary the speed ratio of the mechanism, and spring means acting to press the disks and roller together to provide the necessary friction between the same.

5. In a variable speed friction transmission mechanism, in combination, a driving disk having a toroidal groove the profile curvature of which is a circular arc, a disk coaxial with the first and having an opposing toroidal groove the profile curvature of which is a circular arc of the same radius as the other but having its center of curvature farther from the disk axis, an angularly adjustable roller cooperating with said grooves and arranged with its center between the centers of profile curvature of the grooves, and spring pressure means for producing frictional driving engagement between the disks and the roller.

6. A variable speed friction transmission mechanism as described in claim 1, in which the center of the roller is midway between the profile centers of the grooves.

Signed at Keyport, in the county of Monmouth, and State of New Jersey this 14th day of July, 1930.

FRANK A. HAYES.